W. Mendham,
Pipe Coupling,
N° 101,488. Patented Apr. 5, 1870.
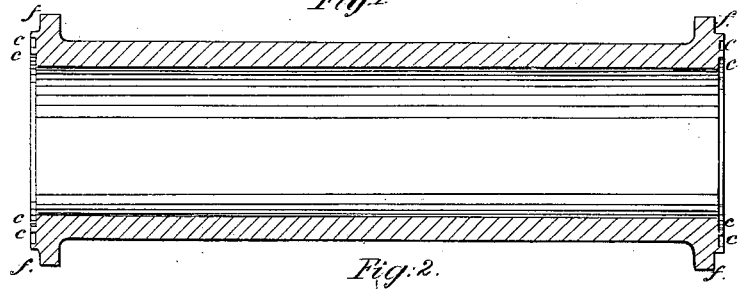
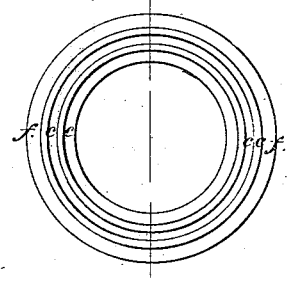
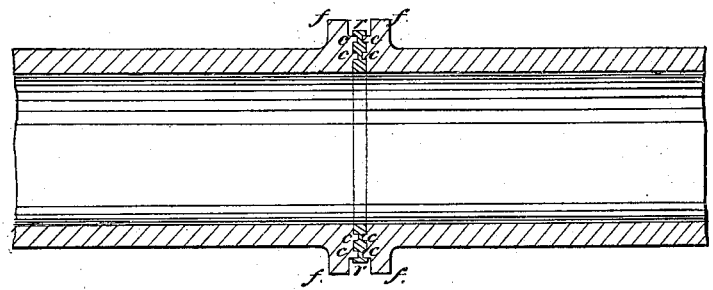
Witnesses:
A. E. Bradley
A. T. Langston
Inventor:
Wm Mendham
By his Attorney
Chas. F. Stansbury

United States Patent Office.

WILLIAM MENDHAM, OF PHILADELPHIA, PENNSYLVANIA, ASSIGNOR TO CYRUS CHAMBERS, JR., AND EDWIN CHAMBERS, OF SAME PLACE.

Letters Patent No. 101,488, dated April 5, 1870; antedated March 29, 1870.

IMPROVEMENT IN STEAM-HEATING PIPES.

The Schedule referred to in these Letters Patent and making part of the same.

To all whom it may concern:

Be it known that I, WILLIAM MENDHAM, of the city and county of Philadelphia, in the State of Pennsylvania, have invented a new and useful Improvement in Steam-heating Pipes; and I do hereby declare the following to be a full and correct description of the same, reference being had to the accompanying drawings, in which—

Figure 1 is a longitudinal section of the pipe;

Figure 2 is an end view showing the face of the flange; and

Figure 3 is a longitudinal section showing the joint between two lengths of pipe with a packing of rubber applied.

The same letter marks the same part in all the figures.

When large numbers of pipes are united by their ends, and used for the conveyance of steam, as in apparatus for heating buildings, they are exposed to great changes of temperature, and consequent expansion and contraction. The aggregate of this expanding or contracting action, in long ranges of pipes, is very considerable, and it is not an uncommon occurrence for the packing between the pipes to be so loosened by their contraction on cooling, when the steam is turned off, that it is immediately blown out when the steam is again let on.

The nature of this invention consists in making the outer faces of the flanges of pipes intended for the conveyance of steam corrugated or ribbed, such ribs being directly opposite each other, so as not to interlock, but to abut against each other when the flanges are brought into contact, so that when two such flanges are brought into juxtaposition with a packing of rubber between them, the ribs or projections on their faces will penetrate the rubber, and securely hold it so that the pressure of the steam will not blow it out, when, by the contraction of the pipe, the longitudinal pressure upon the packing is diminished.

The method of casting my improved pipe is fully described in an application of even date herewith, for a patent for that method.

The drawings illustrate clearly the form of the pipes. They have flanges $f$ $f$ on their ends, and upon the faces of these flanges are raised two or more ribs or corrugations $c$ $c$, as shown.

When two sections of pipe are brought together, as in fig. 3, an annular packing of rubber is placed between them as shown at $r$ in the figure. The flanges being drawn together by bolts and nuts in the usual way, the rubber packing is deeply penetrated by the ribs $c$, which hold it immovable between them, and prevent it from being forced out by the internal pressure of the steam.

Having thus fully described my invention,

What I claim, and desire to secure by Letters Patent, is—

A steam-pipe with ribs or corrugations on the outer faces of its flanges, so arranged as to abut against each other when the flanges are in contact, as and for the purpose set forth.

The above specification of my said invention signed and witnessed at Philadelphia this 2d day of April, A. D. 1869.

WILLIAM MENDHAM.

Witnesses:
THORWALD CHR. DAMBORG,
WM. PRICE D. IS